(12) United States Patent
Ozaki et al.

(10) Patent No.: US 7,431,465 B2
(45) Date of Patent: Oct. 7, 2008

(54) APPARATUS AND METHOD TO DISPLAY IMAGES FROM PROJECTION DEVICE MOUNTED IN VERTICAL POSITION

(75) Inventors: Art Ozaki, Escondido, CA (US); Jean-Pierre Guillou, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 494 days.

(21) Appl. No.: 11/221,908

(22) Filed: Sep. 9, 2005

(65) Prior Publication Data

US 2007/0058141 A1    Mar. 15, 2007

(51) Int. Cl.
G03B 21/14 (2006.01)
(52) U.S. Cl. .......................... 353/98; 353/79
(58) Field of Classification Search ............... 353/79, 353/98, 119, 71
See application file for complete search history.

(56) References Cited

U.S. PATENT DOCUMENTS

| | | | | |
|---|---|---|---|---|
| 3,409,346 | A | * | 11/1968 | Stapsy ........................ 359/733 |
| 4,875,064 | A | | 10/1989 | Umeda et al. |
| 5,400,095 | A | | 3/1995 | Minich et al. |
| 5,428,415 | A | * | 6/1995 | Keelan et al. ................. 353/71 |
| 5,461,437 | A | * | 10/1995 | Tanaka et al. ................. 353/71 |
| 5,469,236 | A | * | 11/1995 | Roessel ....................... 396/432 |
| 5,517,264 | A | | 5/1996 | Sutton |
| 5,946,500 | A | | 8/1999 | Oles |
| 6,008,951 | A | | 12/1999 | Anderson |
| 6,023,289 | A | | 2/2000 | Oravecz et al. |
| 6,323,903 | B1 | | 11/2001 | Poulsen et al. |
| 6,379,012 | B1 | * | 4/2002 | Enochs et al. ................. 353/79 |
| 6,384,876 | B1 | | 5/2002 | Sorensen |
| 6,499,846 | B1 | | 12/2002 | Hiller et al. |
| 6,753,907 | B1 | | 6/2004 | Sukthankar et al. |
| 6,827,446 | B2 | | 12/2004 | Beckett et al. |
| 6,877,863 | B2 | | 4/2005 | Wood et al. |
| 6,929,371 | B2 | * | 8/2005 | Saito .......................... 353/122 |
| 7,090,354 | B2 | * | 8/2006 | Engle et al. ................... 353/70 |
| 7,097,310 | B2 | * | 8/2006 | Perkins et al. ................ 353/99 |
| 2006/0119799 | A1 | * | 6/2006 | Ullmann ...................... 353/69 |
| 2006/0126028 | A1 | * | 6/2006 | Ullman ........................ 353/69 |

OTHER PUBLICATIONS

Perenson, Melissa, "LG Shows Wall-Mounted Projector," Jun. 11, 2005, PCWorld.com.

* cited by examiner

Primary Examiner—William C. Dowling
(74) Attorney, Agent, or Firm—Rader Fishman & Grauer PLLC; Ronald P. Kananen

(57) ABSTRACT

A video projection system has an image deflection device to provide additional mounting options for a projector. The deflection device selectively positions a mirror in front of the projection lens to deflect the video image away from the optical axis of the lens, thereby allowing the projector to be mounted without the lens facing the projection surface. The projector includes an image processor for selectively flipping the video image to accommodate a first mounting configuration in which the projector rests on a horizontal surface with the lens facing the projection surface, a second mounting configuration in which the projector is upside down and attached to a ceiling with the lens facing the projection surface, and a third mounting configuration in which the projector is attached to a vertical surface with the image deflection device mirror positioned in front of the lens to deflect the optical image toward the projection surface.

22 Claims, 5 Drawing Sheets

APPARATUS AND METHOD TO DISPLAY IMAGES FROM PROJECTION DEVICE MOUNTED IN VERTICAL POSITION

BACKGROUND OF THE INVENTION

1. Field of the Invention

The present invention relates generally to video projection systems, and particularly to front projection video systems that can be oriented in various mounting configurations with respect to a projection surface on which an image is projected.

2. Description of the Related Art

Front projection video systems are widely used for business presentations and home entertainment viewing. The projectors of such systems typically include a light source and a display device that create the desired optical image, which is then projected through a lens for viewing on a projection surface. The projector and the projection surface are two separate objects that can be oriented differently with respect to each other.

For example, the projector 10 can be placed on a horizontal surface 11, such as a table top, as shown in FIG. 1, with the lens 12 of the projector 10 facing toward the projection surface 13. Typically a bottom or "mounting" side 14 of the projector 10 in this configuration has adjustable support feet for adjusting the elevation and tilt of the projector 10 to match the direction of the lens 12 with the projection surface 13. As shown in FIG. 2, the projector 10 can also be placed offset to one side or the other of a line perpendicular to the center of the projection surface 13. The projector 10 typically includes an image processor for adjusting horizontal and vertical trapezoidal distortion created by offset placement of the projector 10 relative to the projection surface 13 to maintain a rectangular image on the projection surface 13.

In another common mounting configuration, the projector 10 can be attached upside down to a ceiling 15, as shown in FIG. 3, with the lens 12 of the projector 10 facing toward the projection surface 13. The mounting side 14 of the projector 10 (i.e., the top side in the mounting configuration shown in FIG. 3) is typically attached to a suitable bracket on the ceiling 15, which allows the projector 10 to be adjusted for proper elevation and tilt. The image processor of the projector 10 typically includes an image flip feature that can be set to flip the video image horizontally and vertically to accommodate the upside down mounting of the projector 10.

Almost all projectors on the market today require a horizontal mounting of the projector on either a table or a ceiling, as shown in FIGS. 1 to 3. In these mounting configurations, the projector 10 is positioned with the optical axis of the lens facing toward (i.e., aimed at) the projection surface 13. However, the current trend in home design is for higher ceilings in the home, which can make ceiling-mounted projectors impractical as well as unsightly to have the mounting apparatus hanging from the ceiling. Projectors have also been attached to walls using a shelf supported on the wall, a cantilever projecting from the wall or a metal strut hanging from the wall. However, projectors have not had the additional mounting option of being attached to a wall with the optical axis of the projector lens parallel to the wall (i.e., with the lens facing in a direction other than toward the projection surface). Thus, there is a need in the industry for an improved video projection system that provides additional mounting options for the projector.

SUMMARY OF THE INVENTION

It is an object of the present invention to provide an improved video projection system that solves the problems and shortcomings with the prior art devices described above.

It is a further object of the present invention to provide a video projection system that allows a projector to be mounted in an orientation in which the projection lens does not face the projection surface.

It is a further object of the present invention to provide a video projection system that allows a wide variety of mounting options, including mounting the projector on a wall with the optical axis of the projection lens substantially parallel to the wall and extending in a direction other than toward the projection surface.

It is a further object of the present invention to provide a video projection system having a mounting configuration in which heat can be dissipated from the projector efficiently without interfering with the projected image.

To achieve the stated and other objects, the present invention may be embodied as a video projection system including a projector and an image deflection device. The deflection device functions to position a mirror or other reflective device including but not limited to a prism in front of the projection lens to deflect the video image away from the optical axis of the lens, thereby allowing the projector to be mounted with the lens facing in a direction other than directly toward the projection surface. The projector includes an image processing engine for selectively flipping the video image to accommodate a variety of mounting configurations for the projector, including a first mounting configuration in which the projector rests on a horizontal surface with the lens facing the projection surface, a second mounting configuration in which the projector is upside down and attached to a ceiling with the lens facing the projection surface, and a third mounting configuration in which the projector is attached to a vertical surface with the mirror of the image deflection device positioned in front of the lens to deflect the optical image toward the projection surface.

According to a broad aspect of the present invention, a video projection system is provided, comprising: a projector having a lens for projecting a video image in a first direction for viewing on a projection surface; and an image deflection device having a mirror selectively positioned in front of the lens for deflecting the video image into a second direction for viewing on the projection surface, thereby allowing the projector to be mounted in an orientation in which the lens does not face the projection surface.

According to another broad aspect of the present invention, a video projection device is provided, comprising: an image processing engine for correcting image distortion and orientation in a digitized image signal to accommodate different placement options for the video projection device; a light engine comprising a light source and a display device for creating an optical image from the digitized image signal; a projection lens for projecting the optical image in a first direction for viewing on a projection surface; and an image deflection device having a mirror selectively positioned in front of the projection lens for deflecting the optical image into a second direction for viewing on the projection surface, thereby allowing the projector to be mounted in an orientation in which the projection lens does not face the projection surface.

According to another broad aspect of the present invention, a method of mounting a video projector on a vertical surface is provided, comprising the steps of: providing a video projector having an image processor, a light source and a projection lens; positioning an image deflection device having a mirror in front of the projection lens to deflect an optical image projected along an optical axis of the projection lens into an optical path different from the optical axis; mounting the video projector on a vertical surface with the optical axis of the projection lens substantially parallel with the vertical surface and the optical path leading from the image deflection device directed toward a projection surface on which the optical image is to be displayed; and setting the image processor to flip the optical image to adjust for having the mirror positioned in front of the projection lens.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A video projection system with an image deflection device according to the present invention will now be explained with reference to FIGS. 4 to 9 of the accompanying drawings.

Figure 4:
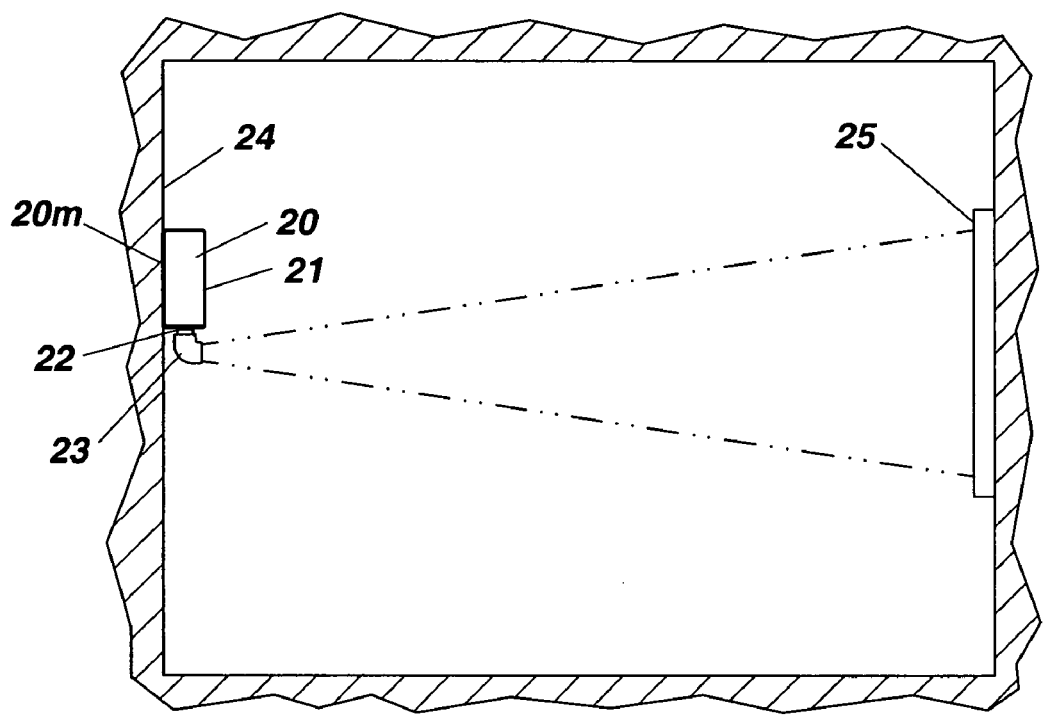
FIG. 4 is a cross section side view of a home theater having a rear wall-mounted video projector equipped with an image deflection device according to the present invention.

The video projection system of the present invention includes a projector 20 having a housing 21, a projection lens 22, and an image deflection device 23. As shown in FIG. 4, the projector 20 is mounted on a vertical wall 24 on an opposite side of a room from a projection surface 25. The projector 20 is mounted with the optical axis of the projection lens 22 facing vertically downward and a mounting side 20m of the projector 20 facing the wall 24. The image deflection device 23 is attached to the projector 20 with a reflecting device, preferably a mirror 26, positioned in front of the projection lens 22 for deflecting a video image from the projector lens 22 toward the projection surface 25. Alternatively, the reflecting device may include, but is not limited to, a prism.

Figure 5:
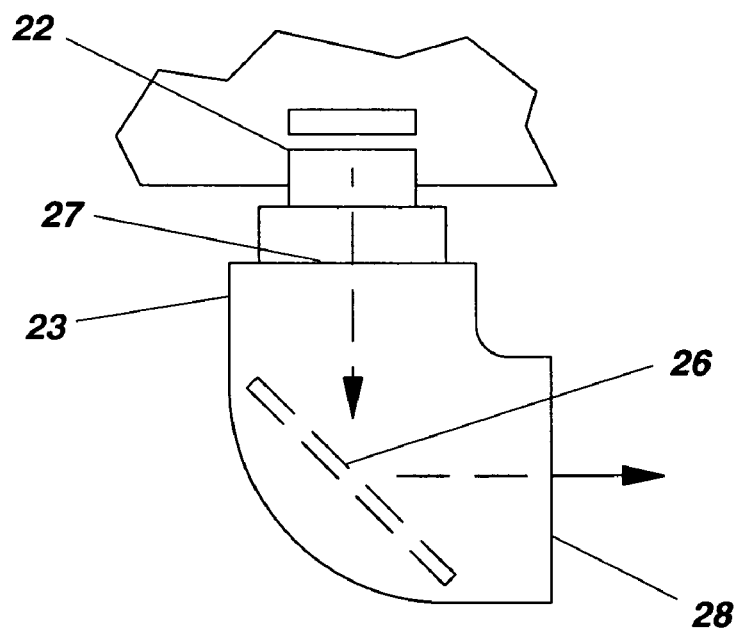
FIG. 5 is an enlarged side view of the image deflection device according to the present invention.
Figure 6:
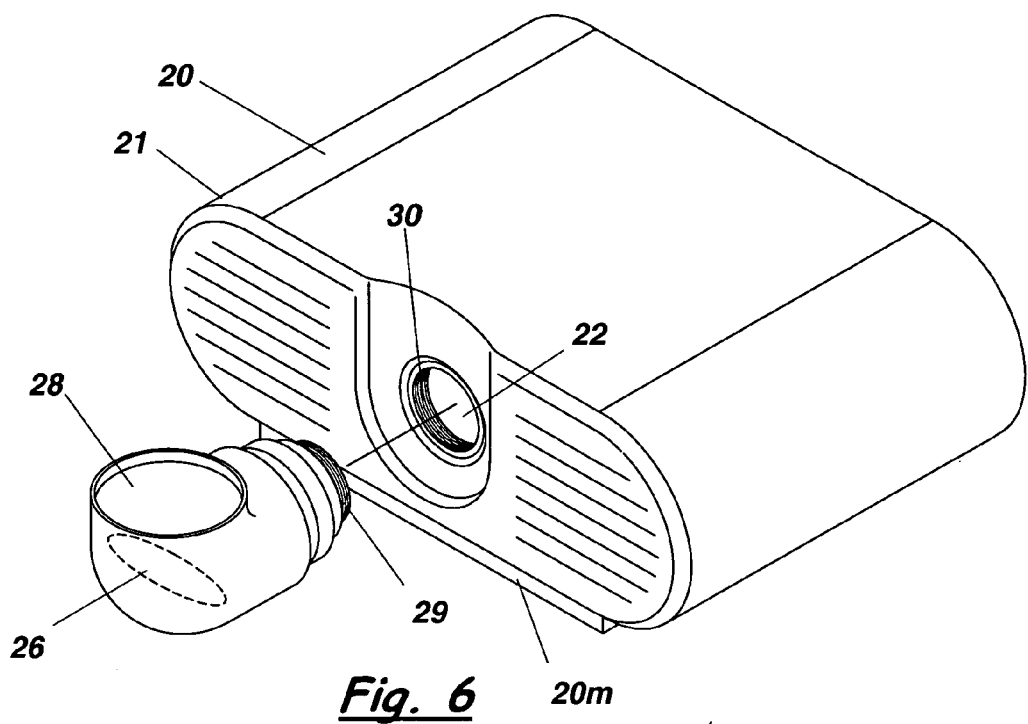
FIG. 6 is a perspective view of a video projector equipped with the image deflection device according to the present invention.
Figure 7:
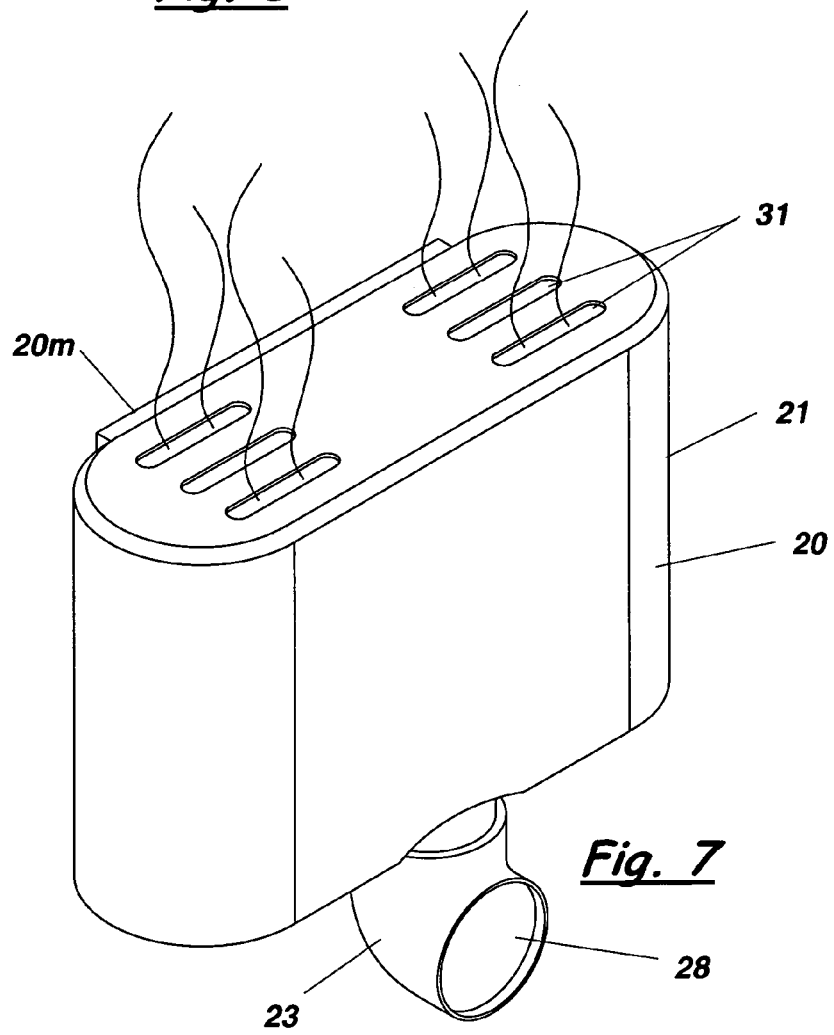
FIG. 7 is a perspective view showing the video projector in a vertical mounting configuration with ventilation apertures on an upper surface of the projector housing.

The image deflection device 23 shown in FIGS. 5 to 7 includes an annular-shaped inlet 27 for receiving an optical image from the projection lens 22, and an annular-shaped outlet 28 through which the deflected optical image is projected. The outlet 28 is oriented at approximately a right angle relative to the inlet 27.

A first threaded component 29 is provided on the inlet 27 of the image deflection device 23 for attaching the device to the housing 21 of the projector 20. A second threaded component 30 is provided on the projector housing 21 coaxial with the projection lens 22. The first and second threaded components 29, 30 can be threaded together to provide a removable coupling between the image deflection device 23 and the projector housing 21.

Alternatively, the components 29, 30 may have smooth ends for slidably mating with a frictional fit suitable for securing the components, preferably in a telescoping configuration. Another contemplated manner of connection of the components 29, 30 is a so-called "bayonet" connection in which the member 29 is engaged within the member 30 by a spring-loaded or frictionally extending detent mating with an associated opening or groove. The detent may be on either member 29 or 30 so that the mating opening is positioned on the other member.

As shown in FIG. 7, the projector housing 21 has ventilation apertures 31 arranged therein on a rear side 32 opposite from the projection lens 22. The ventilation apertures 31 function to ventilate heat away from the electronic components within the projector housing 21, particularly the light source, by allowing the heat to pass upwardly away from the housing 21. This improves the cooling profile and efficiency of the projector 20 because it allows the heat to dissipate away from the projector 20 in a vertical column. This mounting configuration also prevents heat shimmer from interfering with the optical image because the rising heat does not pass in front of the projection lens 22.

Figure 8:
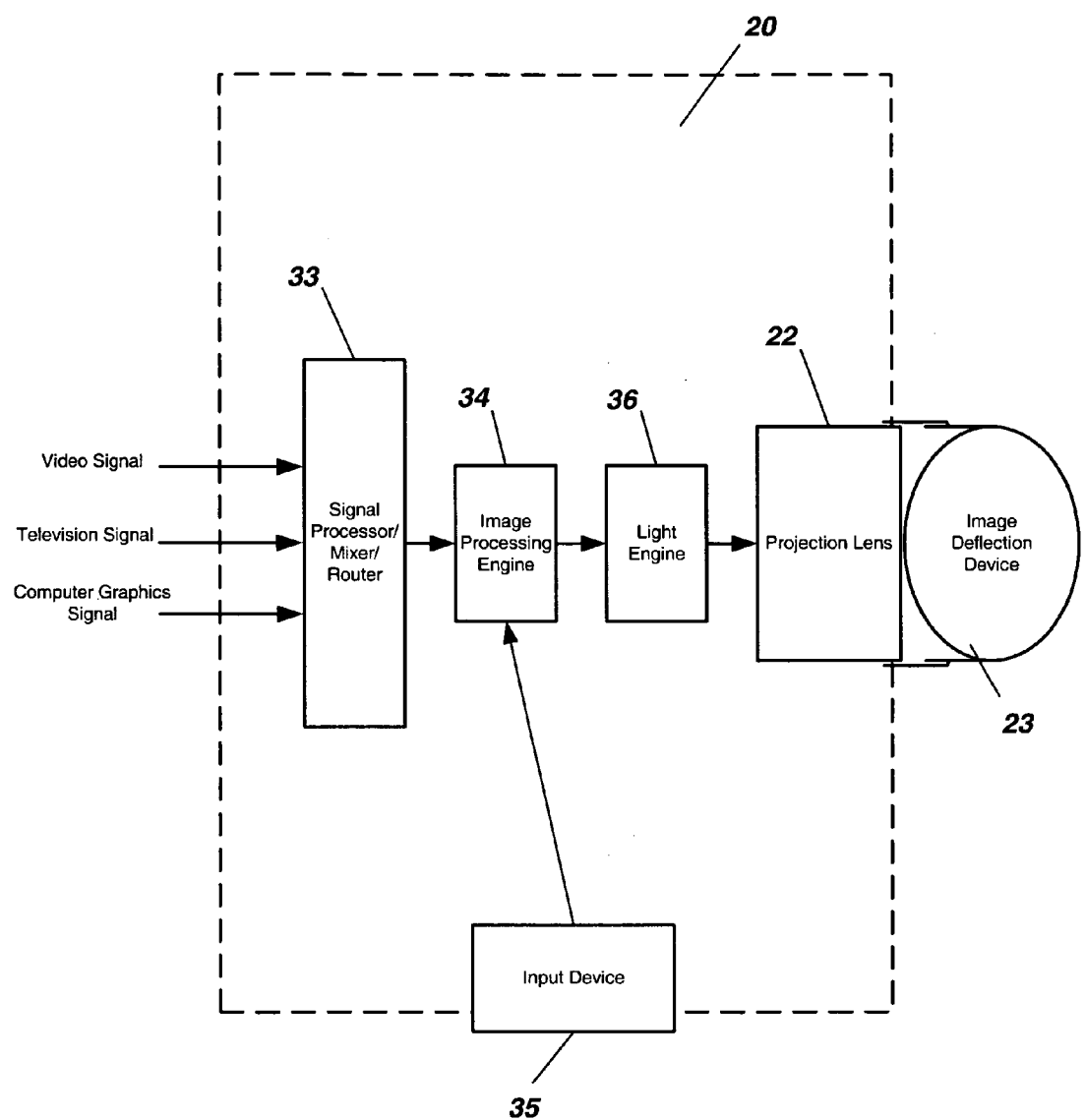
FIG. 8 is a block diagram of the video projector equipped with the image deflection device according to the present invention.
Figure 9:
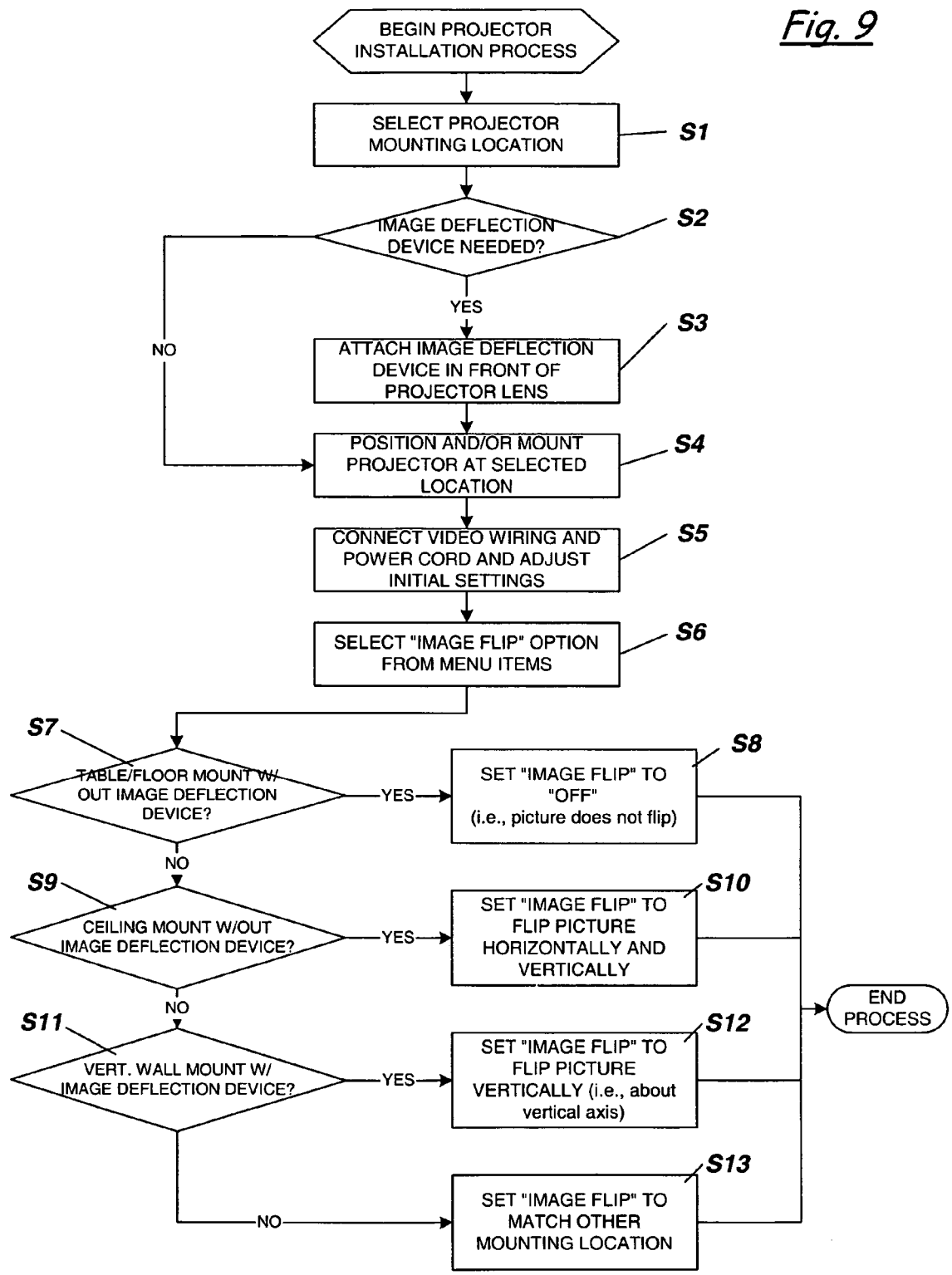
FIG. 9 is a flow chart showing the process of installing a video projector in a variety of mounting configurations according to the present invention.

FIG. 8 provides a block diagram illustration of the projector 20 equipped with an image deflection device 23 according to the present invention. The projector 20 includes a signal processor/mixer/router 33 for receiving respective image data signals from a video signal source, a television signal source, a computer graphics signal source, and the like. The image data signals are mixed and/or multiplexed to produce a selected digitized image signal for input to an image processing engine 34.

The image processing engine 34 uses a variety of conventionally known methods to correct image distortion and orientation in the digitized image signal to accommodate different placement options for the video projector 20. For example, based on menu selections entered through an input device 35, an image flipping means of the image processing engine 34 can selectively flip the optical image horizontally (i.e., about a horizontal axis) or vertically (i.e., about a vertical axis) to change the orientation of the image signal. The image processing engine 34 can also be used to correct the vertical trapezoidal distortion of the optical image to accommodate mounting the projector 20 at an elevation above or below a center of the projection surface 25, and to correct the horizontal trapezoidal distortion of the optical image to accommodate mounting the projector 20 right or left of a center of the projection surface 25. Alternatively it is common to use a function known as lens shift in order to correct geometric distortion. This has the additional advantage of not reducing the resolution of the image. Lens shift is achieved either by moving the image engine within the projector in relation to the projection lens or by moving the projection lens in relation to the image engine.

A light engine 36 in the projector 20 includes a light source (e.g., laser or lamp) and a display device (e.g., LCD or DLP) that either transmit or reflect light from the light source to create the desired optical image from the image signal received from the image processing engine 34. The optical image is then projected onto the projection surface 25 through the projection lens 22 and through the image deflection device 23 (if it is attached). The optical image is projected in a first direction by the projection lens 22 along an optical axis of the projection lens 22. If attached, the image deflection device 23 deflects the optical image into a second direction for viewing on the projection surface 25, thereby allowing the projector 20 to be mounted in an orientation in which the projection lens 22 does not face the projection surface 25.

Figure 1:
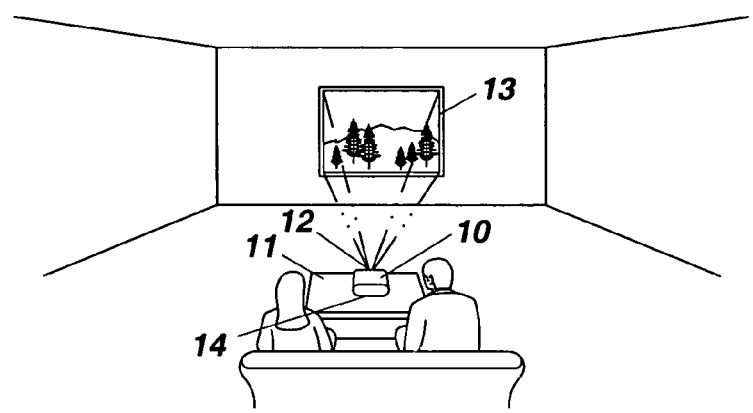
FIG. 1 is a perspective view of a conventional home theater having a table-mounted video projector.
Figure 2:
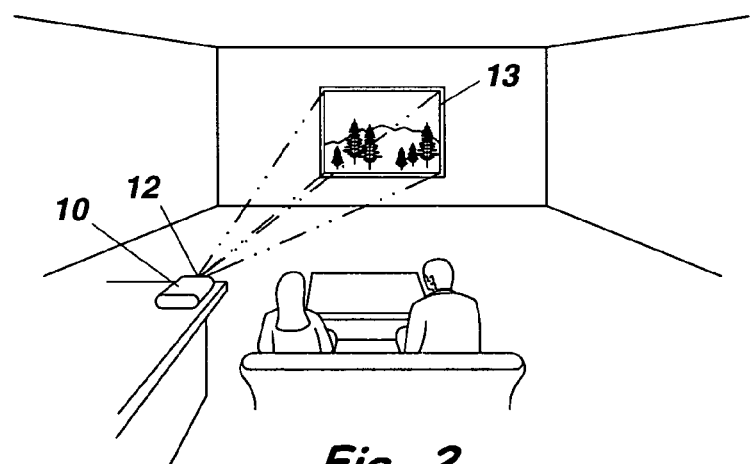
FIG. 2 is a perspective view of a conventional home theater having a side table-mounted video projector.

The image flipping means of the image processing engine 34 has a first setting to accommodate a first mounting configuration for the projector 20 in which a mounting side 20m of the projector 20 faces downwardly and rests on a horizontal surface with the projection lens 22 facing the projection surface 25 (i.e., similar to the configuration shown in FIG. 1). With this first setting, the optical image is not flipped.

Figure 3:
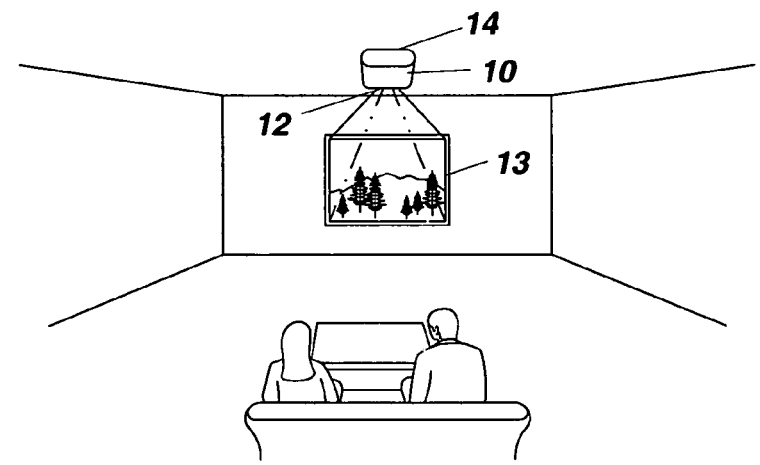
FIG. 3 is a perspective view of a conventional home theater having a ceiling-mounted video projector.

The image flipping means of the image processing engine 34 has a second setting to accommodate a second mounting configuration for the projector 20 in which the projector 20 is upside down with the mounting side 20m of the projector 20 facing upwardly and attached to a ceiling with the lens 22 facing the projection surface 25 (i.e., similar to the configuration shown in FIG. 3). With this second setting of the image flipping means, the optical image is flipped both vertically and horizontally to provide a normal appearance on the projection surface 25.

The image flipping means of the image processing engine 34 has a third setting to accommodate a third mounting configuration for the projector 20 in which the mounting side 20m of the projector 20 faces a vertical surface (e.g., the rear wall 24) and is attached to the vertical surface with an optical axis of the lens 22 substantially parallel with the vertical surface. In this third mounting configuration, the mirror 26 of the image deflection device 23 is positioned in front of the lens 22 to deflect the optical image toward the projection surface 25. An example of this third mounting arrangement is shown in FIG. 4, with the optical axis of the lens 22 extending substantially vertically downwardly. With this third setting of the image flipping means, the optical image is flipped vertically (i.e., about the vertical axis) to compensate for the image reversal caused by the mirror 26 in the image deflection device 23 and provide a normal appearance of the optical image on the projection surface 25.

The video projection system of the present invention has been described above. An installation process and method of mounting a video projector on a vertical surface according to the present invention will now be described with reference to FIG. 9.

In the installation process, the user first selects a desired projector mounting location and orientation for the projector at the selected location, as depicted by step S1. In step S2, the user then determines if an image deflection device 23 is needed to deflect the optical image from the projection lens 22 toward the projection surface 25. For example, the image deflection device 23 will be used when the projector 20 is to be attached to a vertical wall 24 and the projection lens 22 will not be facing the projection surface 25. If the image deflection device 23 is needed, it is then attached or positioned with the mirror 26 thereof in front of the projector lens 22, as indicated by step S3. The projector 20 is then positioned and/or mounted at the selected location, as indicated by step S4, and the projector wiring is connected and the initial settings of the projector are adjusted, as indicated by step S5.

In step S6, the user is then prompted to select an "IMAGE FLIP" option from a list of menu items. If the projector 20 is mounted or positioned upright on a horizontal surface, such as a table or floor, and no image deflection device is used, as indicated by step S7, the process goes to step S8 and the user will set the IMAGE FLIP option to "OFF" so that the optical image is not flipped. If the projector 20 is mounted upside down to a horizontal surface, such as a ceiling, and no image deflection device is used, as indicated by step S9, the process goes to step S10 and the user will set the IMAGE FLIP option to "HV" so that the optical image is flipped both horizontally and vertically. If the projector 20 is mounted to a vertical wall and the image deflection device 23 is used, as indicated by step S11, the process goes to step S12 and the user will set the IMAGE FLIP option to "V" so that the optical image is flipped about the vertical axis to compensate for the image reversal caused by the mirror 26 in the image deflection device 23. If necessary, the image flip option can also be set to match other mounting options for the projector 20, as indicated by step S13.

The preceding description has been presented only to illustrate and describe the invention. It is not intended to be exhaustive or to limit the invention to any precise form disclosed. Many modifications and variations are possible in light of the above teachings. For example, a video projector having a built-in image deflection device movable between operative and nonoperative positions could be provided, instead of the removable image deflection device 23 described above. For another example, the projector could be mounted in a sideways orientation on a wall with the image deflection device 23 used to deflect the image toward the projection surface 25, instead of the vertical orientation shown in the drawings.

The disclosed embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims, which should be construed as broadly as the prior art will permit.

What is claimed is:

1. A video projection system, comprising:
a projector having a lens for projecting a video image in a first direction for viewing on a projection surface; and
an image deflection device having a reflecting device selectively positioned in front of said lens for deflecting the video image into a second direction for viewing on the projection surface, thereby allowing the projector to be mounted in an orientation in which the lens does not face the projection surface, wherein said image deflection device comprises a first threaded component for mating with a second threaded component which is coaxial with the lens of the projector, thereby providing a removable coupling between the image deflection device and the projector.

2. The video projection system as set forth in claim 1, wherein said reflecting device is a mirror.

3. The video projection system as set forth in claim 1, wherein said reflecting device is a prism.

4. The video projection system according to claim 1, wherein said projector comprises an image processing means for selectively flipping the video image to accommodate a first condition in which the mirror of the image deflection device is positioned in front of the lens and a second condition in which the mirror is not positioned in front of the lens.

5. The video projection system according to claim 1, wherein said projector comprises a first mounting configuration in which a mounting side of the projector faces downwardly for resting on a horizontal surface with the lens facing the projection surface, a second mounting configuration in which the mounting side of the projector faces upwardly for attaching to a ceiling with the lens facing the projection surface, and a third mounting configuration in which the mounting side of the projector faces a vertical surface for attaching to the vertical surface and the image deflection device is positioned in front of the lens to deflect the image onto the projection surface.

6. The video projection system according to claim 5, wherein said projector comprises an image processing means for selectively flipping the image to accommodate said first, second and third mounting configurations.

7. The video projection system according to claim 5, wherein an optical axis of the lens in said third mounting configuration extends generally parallel to the vertical surface on which the projector is attached.

8. The video projection system according to claim 7, wherein the optical axis of the lens in said third mounting configuration extends substantially vertically.

9. The video projection system according to claim 8, wherein said projector has a housing with ventilation apertures arranged therein on a side opposite from the lens for ventilating heat away from the housing.

10. The video projection system according to claim 9, wherein said third mounting configuration for the projector has the lens facing downward, and said ventilation apertures are on an opposite side of the housing from the lens for ventilating heat upwardly away from the housing.

11. The video projection system according to claim 1, wherein said image deflection device comprises an annular-shaped inlet for receiving a projected light image from the lens of the projector and an annular-shaped outlet for projecting light therefrom, said outlet being oriented approximately at a right angle relative to said inlet.

12. A video projection device, comprising:
an image processing engine for correcting image distortion and orientation in a digitized image signal to accommodate different placement options for the video projection device;
a light engine comprising a light source and a display device for creating an optical image from the digitized image signal;
a projection lens for projecting said optical image in a first direction for viewing on a projection surface; and
an image deflection device having a mirror selectively positioned in front of said projection lens for deflecting the optical image into a second direction for viewing on the projection surface, thereby allowing the video projection device to be mounted in an orientation in which the projection lens does not face the projection surface,
wherein said image processing engine comprises a means for selectively flipping the optical image horizontally and vertically, and wherein said means for selectively flipping the optical image has a first setting to accommodate a mounting configuration in which the video projection device rests on a horizontal surface with the lens facing the projection surface, a second setting to accommodate a mounting configuration in which the video projection device is upside down and attached to a ceiling with the lens facing the projection surface, and a third setting to accommodate a mounting configuration in which the video projection device is attached to a vertical surface with an optical axis of the lens substantially parallel with the vertical surface and the image deflection device positioned in front of the lens to deflect the optical image toward the projection surface.

13. The video projection device according to claim 12, wherein the optical axis of the lens extends substantially vertically downwardly in the mounting configuration accommodated by the third setting of the means for selectively flipping the optical image.

14. The video projection device according to claim 12, wherein said image processing engine comprises a means for correcting vertical trapezoidal distortion of the optical image to accommodate mounting the projector at an elevation above or below a center of the projection surface.

15. The video projection device according to claim 12, wherein said image processing engine comprises a means for correcting horizontal trapezoidal distortion of the optical image to accommodate mounting the projector right or left of a center of the projection surface.

16. The video projection device according to claim 12 wherein said image processing engine comprises an optical means for correcting horizontal trapezoidal distortion.

17. The video projection device according to claim 12 wherein said image processing engine comprising a lens shift for correcting horizontal trapezoidal distortion.

18. The video projection device according to claim 12, wherein said video projection device comprises a projector housing, and said image deflection device comprises a first component for slidably mating with a second component.

19. The video projection device according to claim 18, wherein said first component and said second component are structurally sized for a telescoping connection.

20. The video projection device according to claim 18 wherein said first component and said second component are connected by a bayonet connection.

21. The video projection device according to claim 12 wherein said image deflection device comprises an annular-shaped inlet for receiving the optical image from the projection lens and an annular-shaped outlet for projecting the optical image therefrom, said outlet being oriented approximately at a right angle relative to said inlet.

22. A video projection device, comprising:
an image processing engine for correcting image distortion and orientation in a digitized image signal to accommodate different placement options for the video projection device;
a light engine comprising a light source and a display device for creating an optical image from the digitized image signal;
a projection lens for projecting said optical image in a first direction for viewing on a projection surface; and
an image deflection device having a mirror selectively positioned in front of said projection lens for deflecting the optical image into a second direction for viewing on the projection surface, thereby allowing the video projection device to be mounted in an orientation in which the projection lens does not face the projection surface,
wherein said video projection device comprises a projector housing, and said image deflection device comprises a first threaded component for mating with a second threaded component on said projector housing which is coaxial with said projection lens, thereby providing a removable coupling between the image deflection device and the projector housing.

* * * * *